(12) United States Patent  (10) Patent No.: US 7,558,183 B2
Stedman  (45) Date of Patent: Jul. 7, 2009

(54) SYSTEM AND METHOD FOR OPTICAL MEDIA MARKING

(75) Inventor: Roy W. Stedman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 793 days.

(21) Appl. No.: 11/031,832

(22) Filed: Jan. 7, 2005

(65) Prior Publication Data

US 2006/0153032 A1  Jul. 13, 2006

(51) Int. Cl.
G11B 7/00 (2006.01)
(52) U.S. Cl. .................................... 369/121; 369/284
(58) Field of Classification Search ................. None
See application file for complete search history.

(56) References Cited

U.S. PATENT DOCUMENTS

| 5,533,002 A | 7/1996 | Abraham ................. 369/275.3 |
| 5,766,495 A | 6/1998 | Parette ........................ 216/54 |
| 6,778,205 B2 | 8/2004 | Anderson et al. ........... 347/251 |
| 6,860,048 B2 | 3/2005 | Foster et al. .................. 40/630 |
| 6,874,553 B2 | 4/2005 | Quinteros et al. ........... 156/391 |

FOREIGN PATENT DOCUMENTS

| EP | 0762407 A3 | 11/1997 |
| EP | 0908875 A3 | 12/2001 |
| EP | 1548738 A1 | 6/2005 |
| JP | 06203527 A | 7/1994 |
| JP | 10011805 A | 1/1998 |
| JP | 2002269836 A | 9/2002 |
| WO | WO 94/10684 | 5/1994 |
| WO | WO2004/012193 | 2/2004 |

*Primary Examiner*—Paul Huber
(74) *Attorney, Agent, or Firm*—Robert W. Holland; Hamilton & Terrile, LLP

(57) ABSTRACT

An information handling system optical medium disc is labeled by removing portions of disc's polycarbonate material from the non-storage side of the disc to form an image. Formed images define a label in various forms including letters, Braille, dot-matrix holes or bas-relief. Another material fills in the removed polycarbonate to reinforce the image with visual effects, such as raising the image or providing color to the image, and to maintain the balance of the disc for rotation in an optical disc drive.

13 Claims, 3 Drawing Sheets

SYSTEM AND METHOD FOR OPTICAL MEDIA MARKING

BACKGROUND OF THE INVENTION

1. Field of the Invention

The present invention relates in general to the field of information handling system optical media, and more particularly to a system and method for optical media marking.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems have become more common and have improved in the speed at which they process information, increasing amounts of information have been generated for storage. Optical media provide a sensible and relatively inexpensive solution for storing large quantities of information on a portable material. Generally, an optical medium stores information by altering the reflective qualities of a data layer material with a focused laser and allows retrieval of information by reflection of the focused laser against the altered material to measure the reflected light characteristics. A typical optical medium disc is made from polycarbonate having a uniform thickness of approximately 2 millimeters. Initially, infrared lasers used to write to CD optical media focused through the surface and most of the thickness of the material to write information, as is depicted by FIG. 1A. With the introduction of red lasers to write to DVD optical media, the laser focus moved to a point mid-way through the surface of the material, as is depicted by FIG. 1B. The most recent development for writing to optical media is the use of a blue laser to write with high definition or Blu-Ray formats. Blue lasers focus closer to the surface of the polycarbonate material, as is depicted by FIG. 1C. Essentially, as laser wavelengths have decreased, information is physically written closer to the surface of the polycarbonate material in part so that a smaller laser focus spot will allow greater amounts of information to fit on optical media of the same physical dimensions, such as the same diameter and thickness.

Although optical media provide a convenient and portable storage solution, one difficulty faced by users of optical media is tracking the contents on any given optical medium without having to insert the medium in an information handling system to read the contents. Read-only media, such as movies and albums, often include labels stuck or painted on the non-storage side of the optical medium. However, such markings generally cannot have a thickness that changes the physical dimensions of the optical medium so that the optical medium will be accepted by standardized disc drives. Further, permanent marking at manufacture does not provide a marking solution that an end user may implement for writable and re-writable media that stores various information. To address this difficulty, optical media labeling solutions have emerged that write labels on the non-storage label side of an optical medium through the interaction of the laser with a chemical coating. However, label writes with a laser are often time-consuming. A more common but less elegant solution is to write a label on the non-storage side with a permanent marker.

SUMMARY OF THE INVENTION

Therefore a need has arisen for a system and method which provides permanent label marking of the non-storage side of an optical medium.

In accordance with the present invention, a system and method are provided which substantially reduce the disadvantages and problems associated with previous methods and systems for labeling optical media. Material is physically manipulated between the depth of an optical medium at which information is written and a non-storage side of the optical medium to present a visible label. Information is read from or written to the optical medium without interference from the label by focusing a laser at the information from a storage side of the optical medium to the depth at which the information is written.

More specifically, polycarbonate material of an optical medium is etched or otherwise removed from the label side of the optical medium to not more than the predetermined depth at which information is stored on the optical medium. The removed polycarbonate presents a visual label, such as letters, Braille, dot-matrix holes and/or a bas-relief image. Coloring is added over the removed material to provide a desired visible effect either by coloring over the surface where material is removed or adding colored material to refill the removed material. Alternatively, clear material is added over removed material to protect underlying images and maintain rotational balance of the optical medium. Labels are created as a part of the manufacture process during formation of the polycarbonate material or, alternatively, added after formation of the optical medium, either before or after information is stored on the optical medium.

The present invention provides a number of important technical advantages. One example of an important technical advantage is that permanent marking of non-storage label sides of an optical medium are made with simple mechanical modifications that have minimal risk of a negative impact on stored information. The physical modification of polycarbonate allows not only visibly distinct marking with three-dimensional effects but also physically distinct marking so that the contents of an optical medium are easily distinguished in the dark or by the visibly impaired. The thickness of the optical medium remains within standard thickness requirements and rotational balance is maintained by adding clear or colored material where material is selectively removed from an optical medium to create a visual image.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Optical medium material is selectively removed from a label side to define a label without interfering with a read of information from a storage side by an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1A:
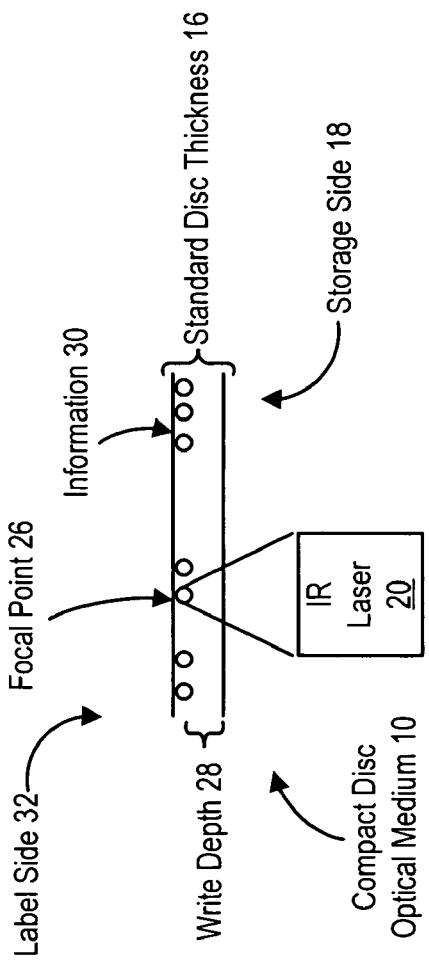
FIG. 1A depicts a CD optical medium that interacts with an infrared laser.
Figure 1B:
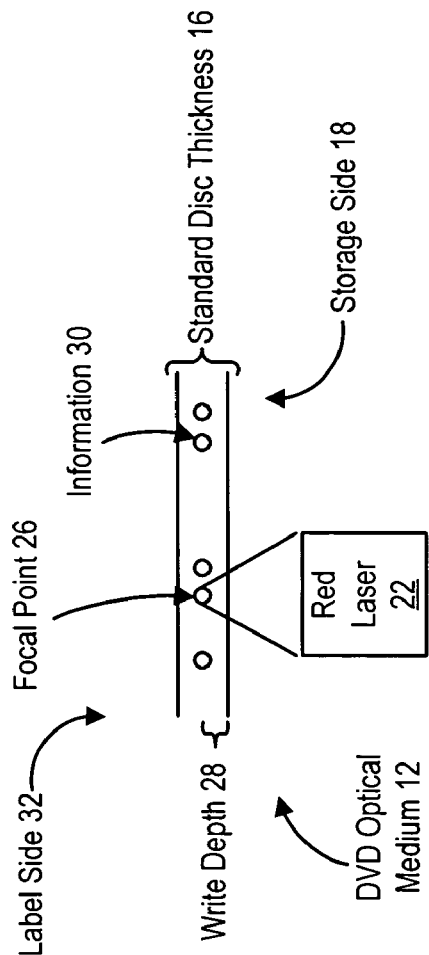
FIG. 1B depicts a DVD optical medium that interacts with a red laser.
Figure 1C:
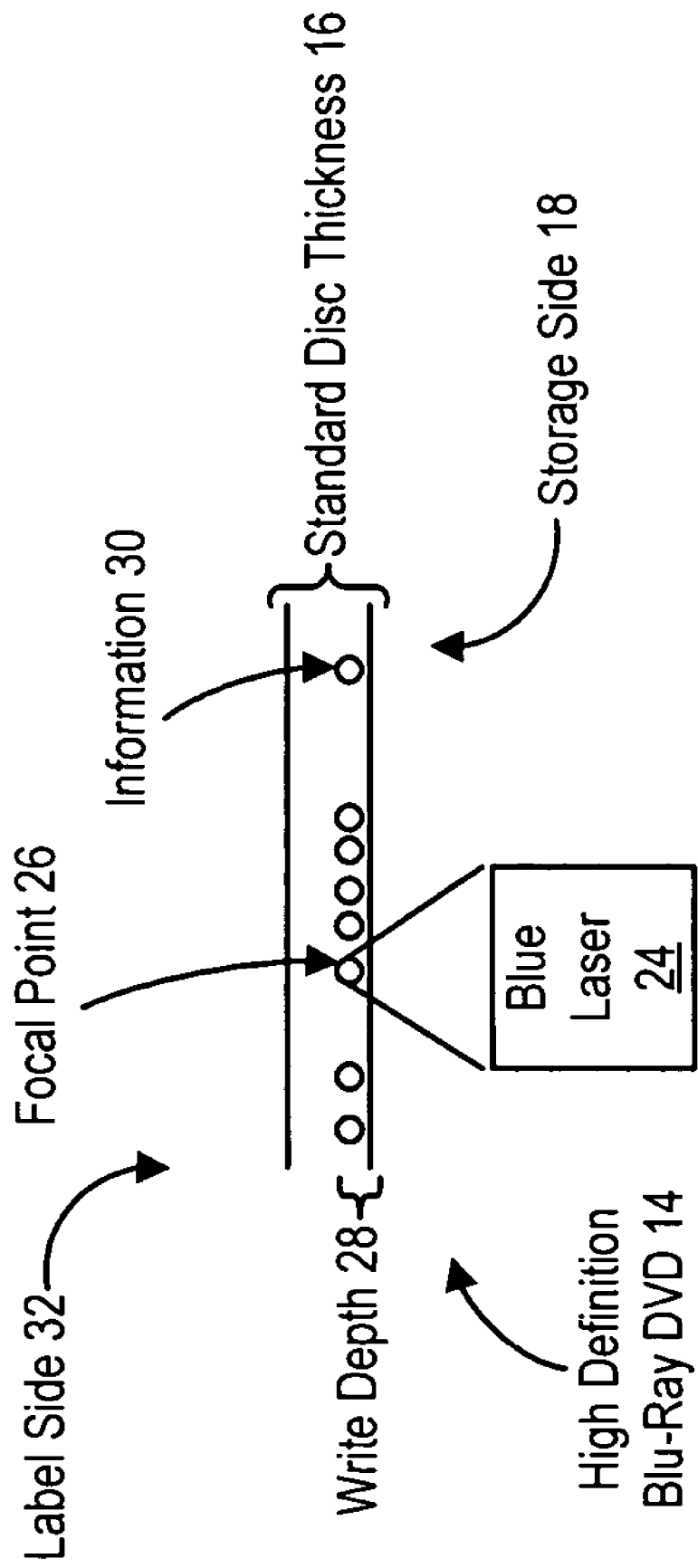
FIG. 1C depicts a high definition DVD optical medium that interacts with a blue laser.

Referring now to FIGS. 1A, 1B and 1C, a CD optical medium 10, DVD optical medium 12 and high definition DVD Blu-ray optical medium 14 are depicted respectively. Each optical medium complies with certain standards that help ensure compatibility of each optical medium in information handling system optical disc drives, such has having a standard disc thickness 16 of polycarbonate material. However, each optical medium also complies with individual standards that allow information to be written or read from the optical medium with desired optical drive equipment. For instance, an infrared laser 20 illuminates CD optical medium 10 through a storage side 18 with a different focal point 26 compared with the red laser 22 used for DVD optical medium 12 and the blue laser 24 of high definition DVD optical medium 14. The location and sized of each focal point 26 and the wavelength of the various lasers determines the write depth at which information 30 is written to or read from each optical medium. The write depth 28 places information 30 relatively close to the label side 32 of CD optical medium 10. By comparison, the write depth 28 places information 30 midway through the thickness 16 of DVD optical medium 12 while the write depth 28 of high definition DVD 14 places information relatively close to the storage surface to leave the greatest portion of thickness 16 unused.

Figure 2:
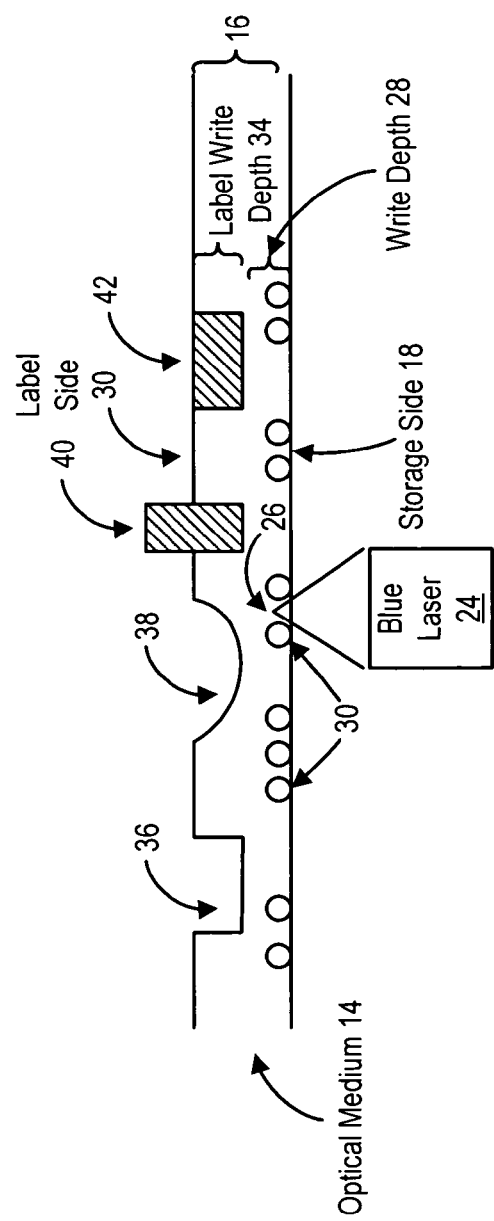
FIG. 2 depicts one example of an optical medium labeled with removal of material from a non-storage side at not greater than a predetermined depth.

Referring now to FIG. 2, one example is depicted of an optical medium labeled with removal of material from a non-storage side at not greater than a predetermined depth. A high definition Blu-Ray DVD optical medium 14 has a relatively small write depth 28 so that information 30 read from or written to optical medium 14 is located proximate the storage side 18. The remainder of thickness 16, which is approximately 1.2 mm, is unused in the reading and writing process applied by laser 24. Thus, the label depth 34, representing the difference of the thickness 16 less the write depth 28, allows an area for physical manipulation and modification of the polycarbonate material without impact on the ability of laser 24 to interact with information 30. For instance, an etching or dot-matrix tool marks label side 30 with indentations 36 that form a label, such as an image, letter or Braille letter. The indentations may themselves have an image form, as depicted by indention 38 having a curved removal of material, with the removal of material carving a bas-relief image. The interior surfaces of indentations 36 and 38 are optionally highlighted with various colors to emphasis the label. The indentations are alternatively filled with clear or colored material to emphasize a visual effect. For instance, indentation 40 is over-filled with material to form an upwardly protruding Braille image. Alternatively, indentation 40 is filled to the original label side surface. Filling in indentations with clear material emphasizes underlying visual effects while filling in indentations with colored material creates visual effects. An advantage to filling in indentations is that the balance of the optical disc while spinning is not disturbed by an uneven weight distribution from missing polycarbonate material.

Figure 3:
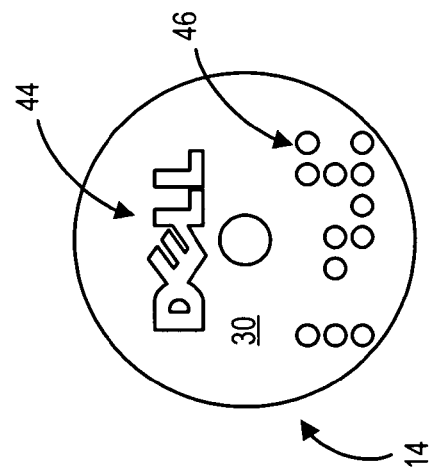
FIG. 3 depicts a top view of an optical medium having a label.

Referring now to FIG. 3, a top view depicts an optical medium 14 having a letter label 44 and a Braille label 46 presented by removal and/or attachment of material at label side 30. Letter label 44 is optionally presented with a number of visual effects, such as removing material to form the letters, coloring in over the removed material, refilling the removed material with clear material and/or refilling the removed material with colored material. Similar visual effects are achieved for artistic images, such as bas-relief images craved or otherwise formed in the polycarbonate. Braille letters 46 are formed similarly or, alternatively raised above the original label surface 30. If necessary to support raised Braille letters, the thickness 16 is reduced so that the thickness 16 plus the upward projection of the Braille letters falls within defined standard thickness. Labels may be formed at manufacture of an optical medium, either before or after information is stamped into the optical medium, or formed after manufacture by etching label surface 30. Further, information may be written to or read from optical medium 14 either before or after formation of the label since lasers focus on the information through the thickness of the optical medium without interference from physical modifications made to the polycarbonate between the write depth and the label surface.

Although the present invention has been described in detail, it should be understood that various changes, substitutions and alterations can be made hereto without departing from the spirit and scope of the invention as defined by the appended claims.

What is claimed is:

1. An optical medium having a storage side and a non-storage side, the optical medium comprising:

polycarbonate material having a predetermined thickness and operable to provide plural reflective properties in response to illumination by a laser through the storage side at a predetermined material depth, the plural reflective properties associated with stored information, wherein the polycarbonate material between the predetermined material depth and the non-storage side is selectively physically modified to present a label.

2. The optical medium of claim 1 wherein the polycarbonate material is further operable to alter the reflective properties in response to illumination by a laser through the storage side at the predetermined depth, the altered reflective properties associated with stored information.

3. The optical medium of claim 1 wherein the selectively physically modified polycarbonate material further comprises material removed to form the label.

4. The optical medium of claim 3 wherein the label comprises letters.

5. The optical medium of claim 3 wherein the label comprises Braille.

6. The optical medium of claim 3 wherein the label comprises dot-matrix holes.

7. The optical medium of claim 3 wherein the label comprises a bas-relief image.

8. The optical medium of claim 3 further comprising replacement material inserted for the removed polycarbonate material, the replacement material presenting a visual image.

9. A method for labeling an optical medium, the method comprising:

preparing a disc of polycarbonate having a predetermined thickness;

altering a label surface of the disc to form a label by removing at least some polycarbonate not greater than a predetermined depth;

altering the polycarbonate at the predetermined depth to have varying reflective qualities associated with information; and illuminating the polycarbonate with a laser through a storage surface at the predetermined depth to read the information.

10. The method of claim 9 further comprising:

adding material to the label surface to rotationally balance the disc.

11. The method of claim 9 wherein illuminating the polycarbonate with a laser further comprises illuminating the polycarbonate with a blue laser.

12. The method of claim 9 wherein illuminating the polycarbonate with a laser further comprises illuminating the polycarbonate with a red laser.

13. The method of claim 9 wherein altering the polycarbonate at the predetermined depth further comprises stamping information into the polycarbonate at manufacture of the disc.

* * * * *